United States Patent
Fiumano et al.

(10) Patent No.: US 9,769,684 B1
(45) Date of Patent: Sep. 19, 2017

(54) METHODS AND SYSTEMS FOR TESTING LATENCY IN A WIRELESS COMMUNICATION NETWORK

(71) Applicant: Sprint Spectrum LP, Overland Park, KS (US)

(72) Inventors: Michael Fiumano, McLean, VA (US); Seng Gan, Ashburn, VA (US); Aaron Hinkle, Centreville, VA (US); Al Ebnereza, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 117 days.

(21) Appl. No.: 14/700,344

(22) Filed: Apr. 30, 2015

(51) Int. Cl.
*H04W 24/06* (2009.01)
*H04L 12/26* (2006.01)

(52) U.S. Cl.
CPC ......... *H04W 24/06* (2013.01); *H04L 43/0852* (2013.01)

(58) Field of Classification Search
None
See application file for complete search history.

(56) References Cited

U.S. PATENT DOCUMENTS

| | | | | |
|---|---|---|---|---|
| 7,539,489 B1* | 5/2009 | Alexander | ............ | H04W 24/06 370/241 |
| 8,190,409 B2 | 5/2012 | Barbaresi et al. | | |
| 8,265,042 B1* | 9/2012 | Nguyen | ................ | H04J 3/0658 370/336 |
| 2005/0125211 A1 | 6/2005 | Nahata et al. | | |
| 2008/0247317 A1* | 10/2008 | Weil | ..................... | H04L 12/2697 370/237 |
| 2008/0311901 A1* | 12/2008 | Bizzarri | ................ | H04W 24/00 455/424 |
| 2013/0085737 A1* | 4/2013 | Hashimoto | ............ | H04B 7/155 703/13 |
| 2014/0092736 A1* | 4/2014 | Baillargeon | ...... | H04W 72/1226 370/230 |
| 2015/0126129 A1* | 5/2015 | Rangappagowda | .. | H04W 24/06 455/67.11 |
| 2015/0281984 A1* | 10/2015 | Takizawa | ........... | H04B 17/3912 455/67.14 |
| 2015/0334750 A1* | 11/2015 | Mehta | ................... | H04W 24/02 370/329 |

OTHER PUBLICATIONS

Testing a Market Leading LTE PGW Subscriber Based Policy Engine, Case Study, Aeroflex, www.aeroflex.com.
MOB550 Mobipass-LTE Multi UE Emulator, http://www.ercom.com/mob550_mobipasslte_multi_ue_emulator/27-99.
TeraVM-Testing LTE/4G Evolved Packet Cores, www.aeroflex.com.

* cited by examiner

*Primary Examiner* — Steven H Nguyen

(57) ABSTRACT

Systems and methods are described for determining latency in a communication network. A non-IP protocol physical interface may be implemented at an access node. The physical interface may be configured to receive a simulated wireless device that mimics a radio-frequency interface. Delay data associated with segmented portions of a backhaul of the communication network may be measured at a base band unit (BBU) of the access node using the simulated wireless device. At least one segment of the backhaul may be isolated based on the measured delay data associated with the segmented portions.

15 Claims, 5 Drawing Sheets

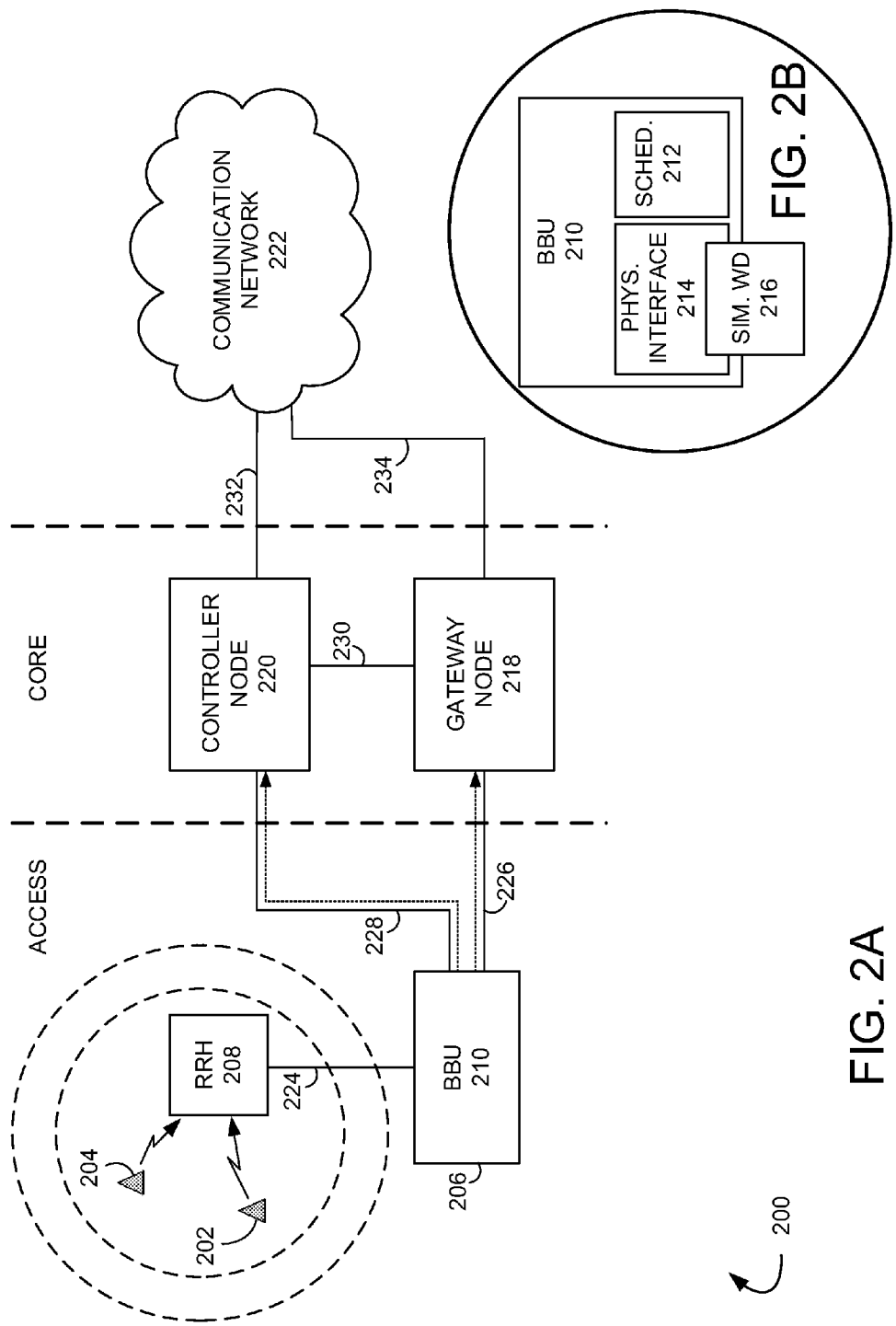

METHODS AND SYSTEMS FOR TESTING LATENCY IN A WIRELESS COMMUNICATION NETWORK

TECHNICAL BACKGROUND

Wireless communications may be used as a means of accessing a network. To facilitate wireless communications, the network core is configured to connect high-speed access provided by a number of wireless standards to mobile applications and services required by wireless device users. Ever-increasing bandwidth and high Quality of Service (QoS) requirements require validation of the design and performance of the network core. For example, the core IP network must be configured to: handle routing and switching, reduce latency and loss without reducing performance, maintain end-user Quality of Experience (QoE) when QoS settings change, and ensure that network security is maintained with minimal performance degradation.

To check the network core capabilities, such as capacity and performance of deployed wireless networks, system testing may be performed. System testing can help discover real-world system problems and performance information such as configuration issues, interference sources (both inter-network and intra-network), radiation pattern issues and holes, cell and sector geographical boundaries, throughput by geography, handoff problems, etc.

OVERVIEW

Systems and methods are described for determining latency in a communication network. In one instance, a non-IP protocol physical interface may be implemented at an access node. The access node may be configured to receive a simulated wireless device that mimics a radio-frequency interface. Delay associated with segmented portions of a backhaul of the communication network may be measured from a base band unit (BBU) of the access node using the simulated wireless device. Based on the measured delay associated with the segmented portions, at least one segment of the backhaul may be isolated.

BRIEF DESCRIPTION OF THE DRAWINGS

FIG. 2A illustrates another exemplary communication system for determining latency in a wireless communication network.

FIG. 2B illustrates a portion of the exemplary communication system for determining latency in the wireless communication network illustrated in FIG. 2A.

DETAILED DESCRIPTION

In an exemplary embodiment, the capabilities (i.e., performance metrics) of a wireless communication system are measured. These performance metrics may include throughput, latency, a reference signal received power (RSRP), signal-to-noise ratio (SNR), reference signal received quality (RSRQ), etc., at segmented portions of the wireless network. In addition, the performance metrics may further include measured packet delay, packet loss, and/or packet jitter at the backhaul of the wireless network. To measure the performance metrics, a test probe that simulates a wireless device Radio Frequency (RF) interface is configured to derive the non-RF performance metrics using real-time monitoring, network diagnostics, and/or network troubleshooting. For example, the test probe and/or simulated wireless device can correlate data across multiple interfaces and across signaling user planes to deliver actionable information from data captured on the interfaces at network elements, e.g., Mobility Management Entity (MME), Serving Gateway (SGW), PDN Gateway (PGW), Policy and Charging Rules Function (PCRF), etc., as well as interfaces interconnected to various other networks.

Figure 1:
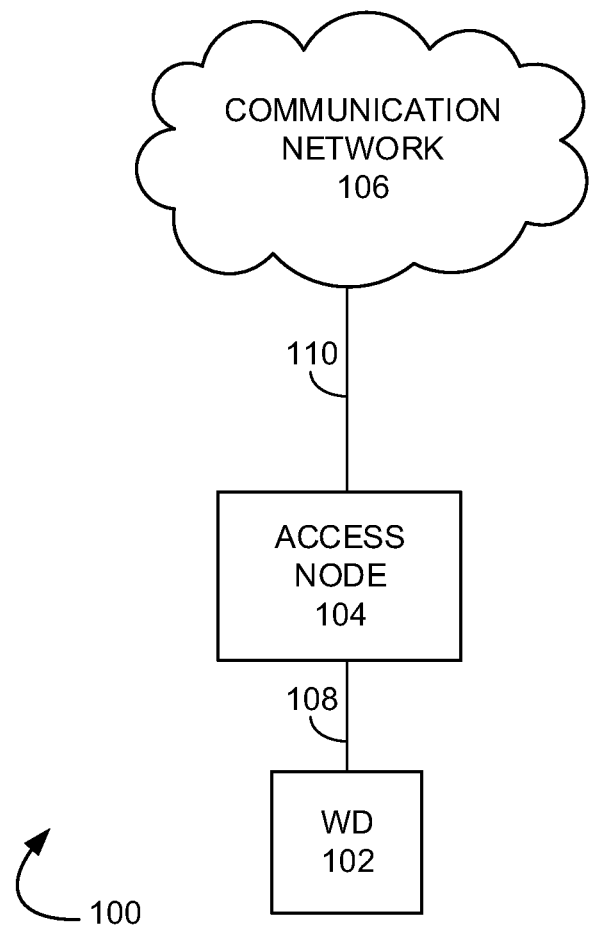
FIG. 1 illustrates an exemplary communication system for determining latency in a wireless communication network.

FIG. 1 illustrates an exemplary communication system 100 for determining latency in a wireless communication network. For example, communication system 100 can comprise simulated wireless device 102, access node 104, and communication network 106. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106, which are omitted for clarity. These network elements may include additional processing nodes, routers, gateways, and physical and/or wireless data links for carrying data among the various network elements.

Simulated wireless device 102 may be any device, system, combination of devices, or other such communication platform capable of simulating a wireless device over-the-air-interface, e.g., Radio Frequency (RF) interface, which measures performance metrics of the wireless communication system via a non-IP protocol physical interface of access node 104. For example, simulated wireless device 102 may be, or comprise, a mobile phone, a wireless phone, a computing platform such as a laptop, palmtop, or a tablet, a personal digital assistant (PDA), or an internet access device, and combinations thereof. The non-IP protocol physical interface can include, for example, a wired Ethernet port or Serial port of access node 104 that is configured to run a non-IP protocol. Simulated wireless device 102 may simulate a wireless device RF interface using real-time monitoring, network diagnostics, and/or network troubleshooting. The simulated wireless device 102 accomplishes this by, for example, correlating data across multiple interfaces and across signaling user planes to deliver actionable information from data captured by probes positioned at interfaces of various network elements. The network elements may include, for example, Mobility Management Entity (MME), Serving Gateway (SGW), PDN Gateway (PGW), Policy and Charging Rules Function (PCRF), etc., as well as various interfaces interconnected to other networks. It is noted that while one simulated wireless device 102 is illustrated in FIG. 1 as simulating a wireless device RF interface via a non-IP protocol physical interface of access node 104, any number of simulated wireless devices can be implemented according to various embodiments discussed herein.

Access node 104 can be any network node that provides air interfaces or simulated air interfaces to wireless devices, e.g., simulated wireless device 102. Examples of access nodes that may be utilized include base transceiver stations (BTSs), radio base stations (RBSs), NodeB, enhanced NodeB (eNodeBs), or the like. Access node 104 may include a number of elements known to those skilled in the art, for example, transceivers, power amplifiers, combiners, duplexers, antennas, control functions, etc. It is noted that while one access node 104 is illustrated in FIG. 1, any number of access nodes can be implemented within system 100.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying data, for example, to support voice, push-to-talk, broadcast video, and data communications by a wireless device, such as simulated wireless device 102. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 can also comprise additional base stations, controller nodes, telephony switches, internet routers, network gateways, computer systems, communication links, or some other type of communication equipment, and combinations thereof.

Communication links 108, 110 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 108, 110 can be direct links or might include various equipment, intermediate components, systems, and networks.

Figure 2C:
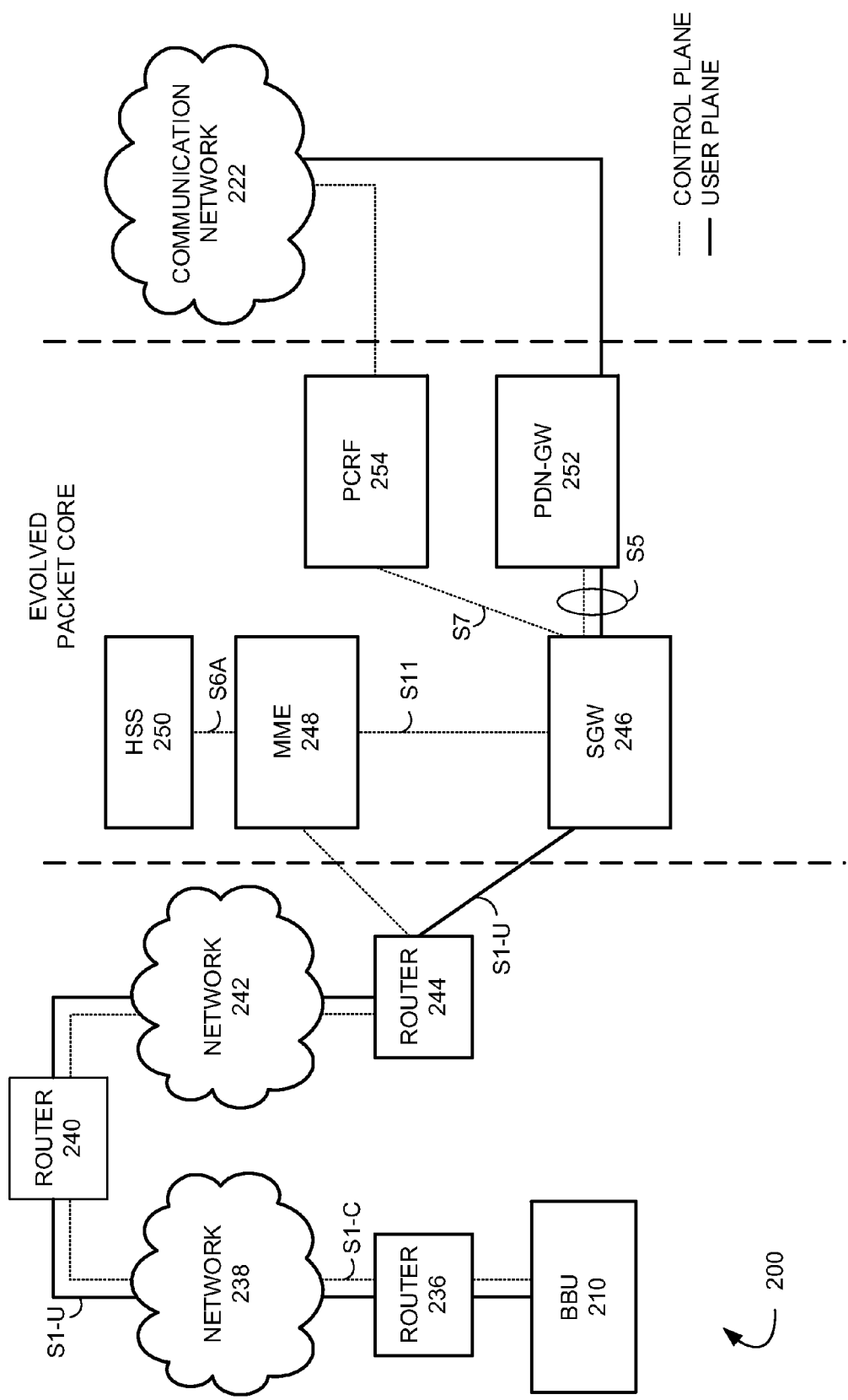
FIG. 2C illustrates a portion of the backhaul of the exemplary communication system for determining latency in the wireless communication network illustrated in FIG. 2A.

FIG. 2A illustrates an exemplary communication system 200 for determining latency in a communication network. FIG. 2B illustrates a portion of the exemplary communication system 200 for determining latency in a communication network as illustrated in FIG. 2A. FIG. 2C illustrates a portion of the backhaul of the exemplary communication system 200 for determining latency in a communication network as illustrated in FIGS. 2A and 2B. Communication system 200 can comprise wireless devices 202, 204, access node 206 (e.g., Remote Radio Head (RRH) 208 and Base Band Unit (BBU) 210), gateway node 218, controller node 220, and communication network 222. Other network elements may be present in the communication system 200 to facilitate communication but are omitted for clarity, such as base stations, base station controllers, gateways, mobile switching centers, dispatch application processors, and location registers, such as a home location register or visitor location register. Furthermore, other network elements may be present to facilitate communication which are omitted for clarity, including additional processing nodes, routers, gateways, and physical and/or wireless data links for carrying data among various network elements.

Wireless devices 202, 204 can be any device configured to communicate over communication system 200 using a wireless interface. For example, wireless devices 202, 204 can include a remote terminal unit, a cell phone, a smart phone, a computing platform such as a laptop, palmtop, or a tablet, a personal digital assistant, or an internet access device, and combinations thereof.

The wireless interface of wireless devices 202, 204 can include one or more transceivers for transmitting and receiving data over communication system 200. Each transceiver can be associated with the same or different frequency bands, the same or different radio access technologies, the same or different network providers, and/or the same or different services. For example, wireless devices 202, 204 can include a transceiver that is associated with one or more of the following: Code Division Multiple Access (CDMA), Global System for Mobile Communications (GSM), Worldwide Interoperability for Microwave Access (WiMAX), Long-Term Evolution (LTE), and/or High-Speed Downlink Packet Access (HSDPA), IEEE 802.11, Wireless Fidelity (Wi-Fi), Bluetooth, Zigbee, Infrared Data Association (IrDA), Multimedia Broadcast Multicast Service (MBMS), etc.

While not illustrated in FIG. 2 for clarity, wireless devices 202, 204 can be in communication with BBU 210 via RRH 208 through communication links. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 202 and access node 206 (e.g., RRH 208 and BBU 210) could share the same representative wireless link, but be transferred over different communication sessions, frequencies, timeslots, packets, ports, sockets, logical transport links, or in different directions—including combinations thereof.

Wireless devices 202, 204 can transmit and/or receive information over communication system 200 using various communication services. These services can include various voice, data, and/or MBMS services and applications. For example, mobile voice services, mobile data services, push-to-talk services, internet service web browsing, email, pictures, picture messaging, video, video messaging, broadcast video, audio, voicemail, music, MP3's, ring tones, stock tickers, news alerts, etc.

Access node 206 (e.g., RRH 208 and BBU 210) can be any network node configured to provide communication between wireless devices 202, 204 and communication network 222. Access node 206 can comprise a processor and associated circuitry to execute or direct the execution of computer-readable instructions to obtain information. Access node 206 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 206 can receive instructions and other input at a user interface or non-IP protocol physical interface, such as a wired Ethernet port or Serial port that is configured to run non-IP protocols. It is noted that while one access node 206 (e.g., RRH 208 and BBU 210) is illustrated in FIG. 2, any number of access nodes can be implemented within system 200.

Gateway node 218 can be any network node configured to interface with other network nodes using various protocols that communicate, route, and forward communication data addressed to wireless devices 202, 204. In addition, gateway node 218 can act as a mobility anchor for wireless devices 202, 204 during handovers between different frequencies and/or different radio access technologies supported by the same access node 206. Gateway node 218 can be a stand-alone computing device, computing system or network component, and can be accessible, for example, by a wired or wireless connection or through an indirect connection such as through a computer network or communication network. For example, gateway node 218 can include a serving gateway (SGW) and/or public data network gateway (PGW), etc. One of ordinary skill in the art would recognize that gateway node 218 is not limited to any specific technology architecture, such as Long Term Evolution (LTE) and can be used with any network architecture and/or protocol.

Gateway node 218 can comprise a processor and associated circuitry to execute or direct the execution of computer-readable instructions to obtain information. Gateway node 218 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 218 can receive instructions and other input at a user interface or non-IP protocol physical interface, such as a wired Ethernet port or serial port that is configured to run non-IP protocols.

Controller node 220 can be any network node configured to communicate information or control information over communication system 200. Controller node 220 can be configured to transmit control information associated with a handover procedure. Controller node 220 can be a stand-alone computing device, computing system, or network component, and can be accessible, for example, by a wired or wireless connection, or through an indirect connection such as through a computer network or communication network. For example, controller node 220 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 220 is not limited to any specific technology architecture, such as Long Term Evolution (LTE) and can be used with any network architecture and/or protocol.

Controller node 220 can comprise a processor and associated circuitry to execute or direct the execution of computer-readable instructions to obtain information. Controller node 220 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 220 can receive instructions and other input at a user interface or non-IP protocol physical interface, such as a wired Ethernet port or serial port that is configured to run non-IP protocols.

Access node 206 (e.g., RRH 208 and BBU 210) can be in communication with gateway node 218 through communication link 226 and controller node 220 through communication link 228. Gateway node 218 can be in communication with controller node 220 through communication link 230 and with communication network 222 through communication link 234. Controller node 220 can be in communication with communication network 222 through communication link 222.

Communication links 226, 228, 230, 232, 234 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can be used. Communication links 226, 228, 230, 232, 234 can be a direct link or might include various equipment, intermediate components, systems, and networks.

Communication network 222 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 222 can be capable of carrying data, for example, to support voice, push-to-talk, broadcast video, and data communications by a wireless device, such as wireless device 202. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 222 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 222 can also comprise additional base stations, controller telephony switches, internet routers, network gateways, computer systems, communication links, or some other type of communication equipment, and combinations thereof.

In operation, the capabilities (i.e., performance metrics) of system 200 can are measured using simulated wireless device 216, illustrated in FIG. 2B. For example, in an exemplary embodiment, simulated wireless device 216 is configured to simulate a Radio Frequency (RF) interface of wireless devices 202, 204 and derive the performance metrics of system 200 using real-time monitoring, network diagnostics, and/or network troubleshooting. The simulated wireless device 216 is designed to correlate data across multiple network interfaces, e.g., gateway node 218, and across signaling user planes.

Network latency and throughput are two critical performance metrics of system 200, and is a sum delay of all network components, including over-the-air interface, the processing, switching, and queuing of all network elements (from the RAN to the internet) along a path, and the propagation delay in communication links 224, 226, 228, 230, 232, 234. As illustrated in FIGS. 2B and 2C, for example, in a packet-switched network, network latency and throughput (as described in 3GPP) can be measured as either control-plane (e.g., S1-C, S11, S6A, S5, S7, etc.) latency or user-plane latency (e.g., the one-way transit time between a packet being available at an Internet Protocol (IP) layer in either the UE/RAN edge node and the availability of this packet at the IP layer in the RAN edge node/UE. The RAN edge node is the node providing the RAN interface towards the core network.). Network latency and throughput may be further augmented by queuing delays at access node 206 (e.g., scheduler 212 of BBU 210 illustrated in FIG. 2B) and processing delays. The performance metrics, for example, throughput latency, RSRP, SNR, RSRQ, packet delay, packet loss, and/or packet jitter, etc., of system 200 may be measured using simulated wireless device 216, which may be configured to correlate data across multiple network interfaces and across signaling user planes of system 200.

For example, in operation, BBU 210 transmits and receives user traffic over an assigned radio or channel at packet scheduler 212, illustrated in FIG. 2B. Packet scheduler 212 can be configured to coordinate packet transmission of a minimum schedulable physical resource block (e.g., two resource blocks per one transmission time interval) over-the-air from the BBU 210 of access node 206 among connected wireless devices 202, 204 via RRH 208. In addition, packet scheduler 212 can collect and store over-the-air and backhaul capacity and transmission delay characteristics (e.g., guaranteed bit rate/non-guaranteed bit rate, busy hour, backhaul limitations/capacity, mobility, available spectrum, latency, etc.) at the BBU 210 of access node 206.

In some instances a test probe (not shown) may be used for operational testing of network latency and throughput of system 200 at access node 206, cell site routers 236, 240, 244, Ethernet Networks 238, 242, and in the Evolved Packet Core 246, 248, 250, 252, 254. For example, test probes (not shown) may be provided for incorporation in a test environment. The test probes (not shown) may include circuitry for simultaneously generating network traffic over multiple network interfaces (e.g., at non-IP protocol physical interface 214, cell site routers 236, 240, 244, Ethernet Networks, 238, 242, and Evolved Packet Core 246, 248, 250, 252, 254) and have a capability to combine client and access point (AP) emulation capabilities with protocol tests to enable testing of system 200 behavior.

In another exemplary embodiment, the test probes (not shown) may include a latency measurement that applies, for example, time stamps to resource blocks and/or data frames as they are transmitted and received at various network interfaces (e.g., at non-IP protocol physical interface 214, cell site routers 236, 240, 244, Ethernet Networks, 238, 242, and Evolved Packet Core 246, 248, 250, 252, 254) of the test module. Each network interface (e.g., at non-IP protocol physical interface 214, cell site routers 236, 240, 244, Ethernet Networks, 238, 242, and Evolved Packet Core 246, 248, 250, 252, 254) can be programmed to perform a variety of functions, including monitoring and analyzing traffic on a control channel, etc.

However, there exists no mechanism or interface for testing system 200 via access node 206, over an S1-u LTE interface, and through gateway 218 in real-time without coming in over the Radio Frequency (RF) interface of wireless devices 202, 204. In another exemplary embodiment, therefore, the relative contribution of any individual network element, such as gateway node 218, may be tested through, for example, a non-IP physical interface of BBU 210 of access node 206 using simulated wireless device 216. Simulated wireless device 216 may be configured to segment, test, and prove a wired portion of system 200 from a wireless portion of system 200.

Figure 3:
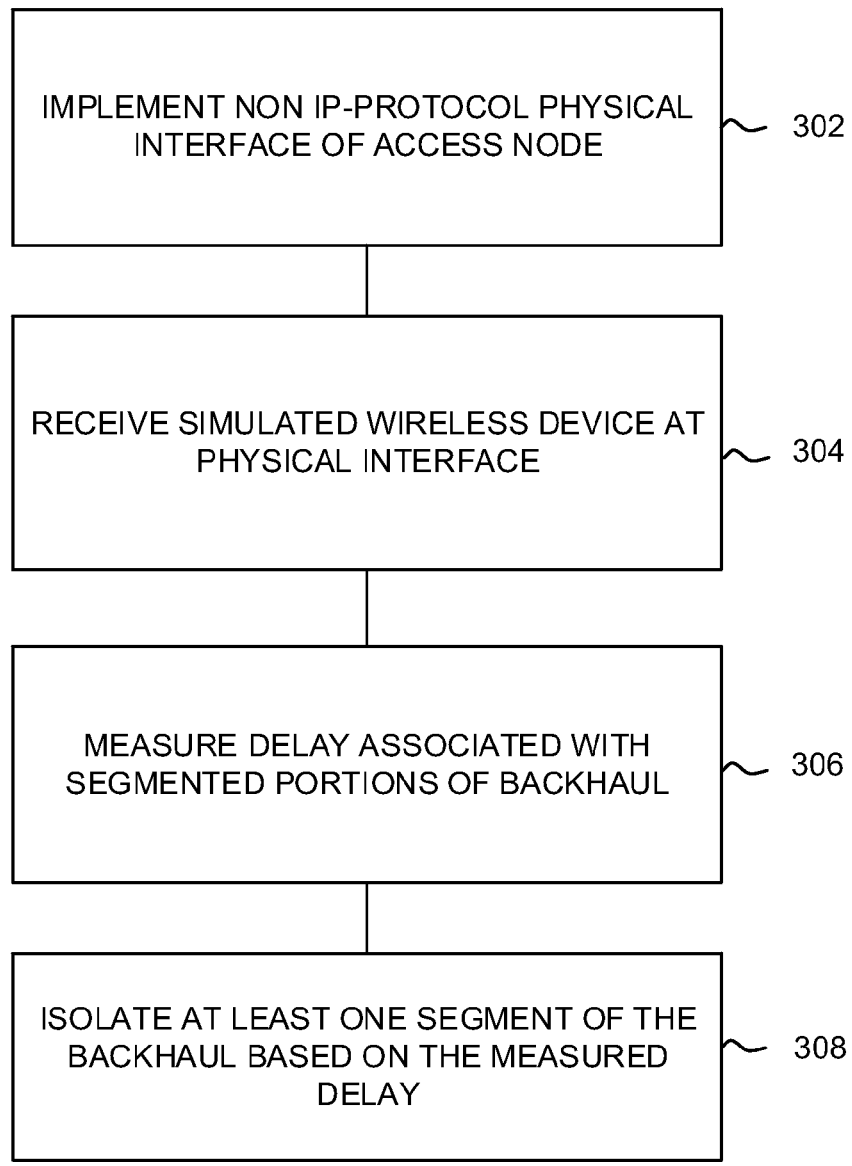
FIG. 3 illustrates an exemplary method for determining latency in a wireless communication network.

FIG. 3 illustrates an exemplary method for determining latency in a wireless communication network. The method for determining latency in a wireless communication network can be implemented in the exemplary communication system 100 illustrated in FIG. 1, in the exemplary communication system 200 illustrated in FIGS. 2A-2C, or with any suitable communication system. The method for determining latency illustrated in FIG. 3 is discussed with reference to the communication system 200 illustrated in FIGS. 2A-2C. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 3, at step 302, a non-IP protocol physical interface may be implemented at an access node. For example, in an exemplary embodiment, BBU 210 of access node 206, illustrated in FIGS. 2A-2C, includes a wired Ethernet port or serial port that is configured to run a non-IP protocol and receive simulated wireless device 216. The non-IP protocol is designed such that simulated wireless device 216 is capable of simulating an over-the-air interface of wireless devices 202. 204, e.g., Radio Frequency (RF) interface, without coming in over-the-air.

At step 304, a simulated wireless device is received at the non-IP protocol physical interface. For example, in an exemplary embodiment, simulated wireless device 216 may be received at the wired Ethernet port or serial port, e.g., non-IP protocol physical interface 214, of BBU 210 of access node 206.

At step 306, delay associated with a segmented portion of the backhaul is measured. For example, wireless devices 202, 204 may initially establish communication links with access node 206 (e.g., upon initialization or during a handover procedure). Data addressed to the wireless devices 202, 204 may be communicated from controller node 220 to wireless devices 202, 204 via scheduler 212 of access node 206. Wireless device traffic associated with, for example, wireless devices 202, 204 can affect loading, backhaul capacity, and transmission delay characteristics (e.g., guaranteed bit rate/non-guaranteed bit rate, busy hour, backhaul limitations/capacity, mobility, available spectrum, latency, etc.) of communication network 222. In an exemplary embodiment, simulated wireless device 216 is configured to mimic an over-the air interface, e.g., Radio Frequency (RF) interface, of wireless devices 202, 204 using the non-IP protocol physical interface 214 (e.g., wired Ethernet or Serial port) of BBU 210 of access node 206 while excluding the over-the-air interface. In addition, simulated wireless device 216 is configured to leverage the S1-u interface, illustrated in FIG. 2C, from BBU 210 of access node 206 through a core data network of system 200 and test the communication network 222 in a segmented fashion using test probes (not shown). For example, in an exemplary embodiment, simulated wireless device 216 may be configured to leverage scheduler 212 of access node 206 and/or bypass scheduler 212 to prove out distinct portions of the functionality of access node 206.

At step 308, at least one segment of the backhaul of the communication network may be isolated based on the measured delay. For example, network latency and throughput of system 200 may be measured using test probes at, for example, cell site routers 236, 240, 244, Ethernet networks 238, 242 (e.g., Ethernet Service Providers, LEC/MAN, AAV, WAN, etc.), SGW 246, MME 248, HSS 250, PGW 252, PCRF 254, etc., which may be configured to correlate data across multiple backhaul network interfaces in the core data network of system 200 by leveraging the S1-u interface, illustrated in FIG. 2C. BBU 210 of access node 206 can collect and store the backhaul capacity and transmission delay characteristics associated with each network interface of the core data network of system 200. Scheduler 212 may be configured to transmit and receive user traffic over an assigned radio or channel based on the determined network latency and through put associated with segmented portions of the backhaul of the core data network of system 200. In addition, the simulated wireless device 216 may be configured to report the measured delay associated with each segment of the backhaul to a transceiver, receiver, and/or network system operator.

Figure 4:
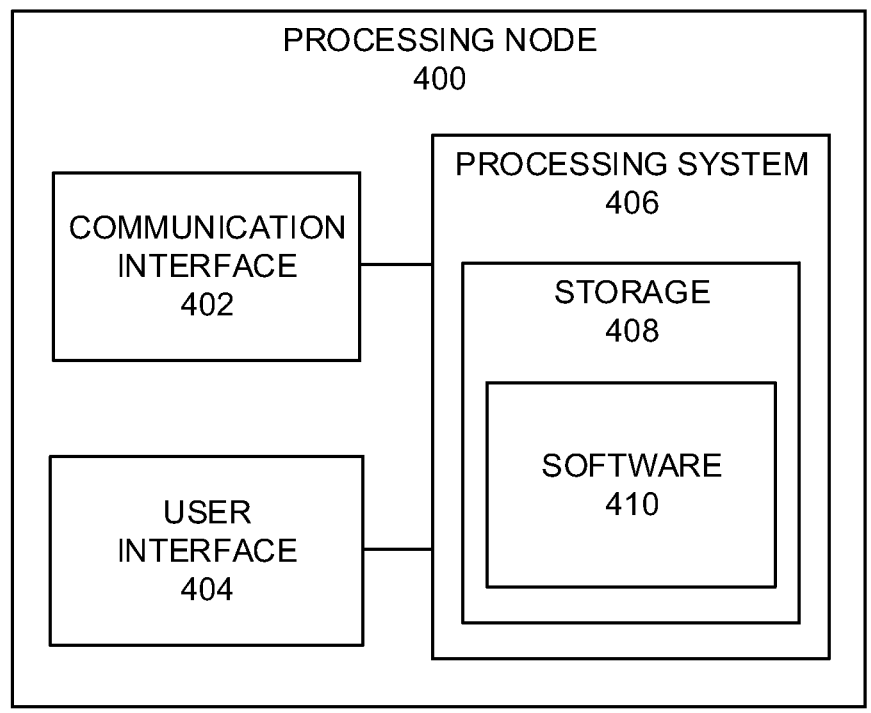
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include access nodes 104, 206, gateway node 218, controller node 220, CSR 236, 240, 244, SGW 246, MME 248, HSS 250, PGW 252, and PCRF 254. Processing node 400 can also be an adjunct or component of a network element, such as an element of access nodes 104, 206, gateway node 218, controller node 220, CSR 236, 240, 244, SGW 246, MME 248, HSS 250, PGW 252, and PCRF 254. Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining latency in a communication network, the method comprising:
   implementing a non-IP protocol physical interface of an access node, the non-IP protocol physical interface being configured to receive a simulated wireless device;
   measuring delay data associated with segmented portions of a backhaul of the communication network at base band unit (BBU) of the access node using a simulated wireless device; and
   isolating at least one segment of the backhaul based on the measured delay data associated with the segmented portions,
   wherein the simulated wireless device is configured to mimic a radio-frequency interface without transmitting over-the-air, and
   wherein the simulated wireless device is configured to leverage a packet scheduler of the access node to prove out distinct portions of the measured delay data associated with the segmented portions of the backhaul.

2. The method of claim 1, wherein the non-IP protocol physical interface is a wired Ethernet port.

3. The method of claim 1, wherein the simulated wireless device leverages a S1-u interface from the BBU of the access node through a core data network to segregate the segmented portions of the backhaul.

4. The method of claim 1, wherein the simulated wireless device is configured to bypass a packet scheduler of the access node to prove out distinct portions of the measured delay data associated with an overall functionality of the access node.

5. The method of claim 1, wherein a packet scheduler is configured to collect and store the measured delay data.

6. The method of claim 5, wherein the wireless device is configured to transmit and receive user traffic over an assigned control channel based on the measured delay data associated with the at least one isolated segment of the backhaul.

7. The method of claim 6, wherein the simulated wireless device is configured to report the measured delay data associated with the at least one isolated segment of the backhaul to a network system operator.

8. A system for determining latency in a communication network, the system comprising:
a processing node comprising a processor and a computer-readable medium containing instructions, wherein execution of the instructions by a processor of the processing node causes the processor to:
implement a non-IP protocol physical interface;
determine a delay associated with segmented portions of a backhaul of the communication network based on a measurement from a test probe; and
isolate at least one segment of the backhaul based on the determined delay associated with the segmented portions,
wherein the test probe simulates a radio-frequency interface of a wireless device at the non-IP protocol physical interface without transmitting over-the-air, and
wherein the test probe leverages a packet scheduler to prove out distinct portions of the measured delay data associated with the segmented portions of the backhaul.

9. The system of claim 8, wherein the non-IP protocol physical interface is a wired Ethernet port.

10. The system of claim 8, wherein the test probe is configured to leverage an S1-u interface to segregate the segmented portions of the backhaul.

11. The system of claim 8, wherein the test probe is configured to bypass the packet scheduler to prove out distinct portions of the measured delay data associated with an overall functionality of the access node.

12. The system of claim 8, wherein the test probe is configured to collect and store the measured delay data.

13. The system of claim 12, wherein the test probe is configured to transmit and receive user traffic over an assigned channel based on the measured delay data associated with the at least one isolated segment of the backhaul.

14. The system of claim 8, wherein the wherein the test probe is configured to report the measured delay data associated with the at least one isolated segment of the backhaul to a network system operator.

15. A method for determining latency in a communication network, the method comprising:
measuring delay data associated with segmented portions of a backhaul of the communication network at a base band unit (BBU) of an access node using a simulated wireless device that mimics a radio-frequency interface, the simulated wireless device being received at a non-IP protocol physical interface of the access node; and
isolating segments of the backhaul based on the measured delay data,
wherein the simulated wireless device bypasses a packet scheduler of the access node to prove out the isolated segments associated with an overall functionality of the access node.

* * * * *